(12) United States Patent
Krishnamurthy et al.

(10) Patent No.: US 11,645,674 B2
(45) Date of Patent: May 9, 2023

(54) SYSTEM AND METHOD OF DISPLAYING IN-VEHICLE ADVERTISING CONTENT

(71) Applicant: Nissan North America, Inc., Franklin, TN (US)

(72) Inventors: Vikram Krishnamurthy, Palo Alto, CA (US); Kusha Nezafati, Davis, CA (US); Erik Stayton, Ashland, MA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 77 days.

(21) Appl. No.: 16/837,550

(22) Filed: Apr. 1, 2020

(65) Prior Publication Data
US 2021/0312500 A1    Oct. 7, 2021

(51) Int. Cl.
G06Q 30/02        (2023.01)
G06Q 30/0251      (2023.01)

(52) U.S. Cl.
CPC ..... *G06Q 30/0266* (2013.01); *G06Q 30/0255* (2013.01); *G06Q 30/0257* (2013.01)

(58) Field of Classification Search
CPC ............... G06Q 30/02; G06Q 30/0266; G06Q 30/0257; G06Q 30/0255; G06Q 30/0207–30/0277
See application file for complete search history.

(56) References Cited

U.S. PATENT DOCUMENTS

| | | | |
|---|---|---|---|
| 8,694,328 B1* | 4/2014 | Gormley | G06Q 30/0621 |
| | | | 705/26.7 |
| 9,854,290 B2 | 12/2017 | Chen et al. | |
| 10,154,319 B1 | 12/2018 | Ramakrishnan et al. | |
| 10,176,499 B2 | 1/2019 | Deluca et al. | |
| 10,225,622 B2 | 3/2019 | Bhogal et al. | |
| 10,832,261 B1* | 11/2020 | Chan | G06Q 40/025 |
| 10,957,227 B2* | 3/2021 | DeLorean | G08G 1/052 |
| 2004/0215524 A1* | 10/2004 | Parkyn | G06Q 30/02 |
| | | | 705/26.8 |
| 2005/0024189 A1* | 2/2005 | Weber | G06Q 30/02 |
| | | | 340/425.5 |
| 2007/0124041 A1* | 5/2007 | Kwon | H04N 21/4122 |
| | | | 348/E5.002 |
| 2009/0091439 A1* | 4/2009 | Sekiyama | G08G 1/127 |
| | | | 340/459 |
| 2011/0078024 A1* | 3/2011 | Messier | G06Q 30/0266 |
| | | | 705/14.62 |
| 2011/0231257 A1* | 9/2011 | Winters | G06Q 30/0255 |
| | | | 705/14.53 |
| 2013/0030645 A1* | 1/2013 | Divine | B60K 35/00 |
| | | | 709/217 |

(Continued)

FOREIGN PATENT DOCUMENTS

JP    5178271 B2 *    3/2008

*Primary Examiner* — Thuy N Nguyen
(74) *Attorney, Agent, or Firm* — Global IP Counselors, LLP

(57) ABSTRACT

A system and method of displaying advertising content includes transmitting data associated with a vehicle to a data center. An advertisement is generated based on the transmitted data. The advertisement is transmitted to the vehicle. An evaluation period is determined during which the advertisement is prevented from being displayed. The advertisement is displayed on a display of an in-vehicle infotainment system following the evaluation period.

15 Claims, 6 Drawing Sheets

(56) References Cited

U.S. PATENT DOCUMENTS

| | | | | |
|---|---|---|---|---|
| 2013/0132172 A1* | 5/2013 | Liu | ........................ | G06Q 30/02 |
| | | | | 705/14.62 |
| 2013/0275224 A1* | 10/2013 | Prakah-Asante | .. | G06Q 30/0241 |
| | | | | 705/14.62 |
| 2014/0006150 A1* | 1/2014 | Thompson | ......... | G06Q 30/0251 |
| | | | | 705/14.53 |
| 2015/0220992 A1* | 8/2015 | Brown | ................ | G06Q 30/0261 |
| | | | | 705/14.62 |
| 2016/0104486 A1* | 4/2016 | Penilla | .................... | G10L 15/02 |
| | | | | 704/232 |
| 2017/0200449 A1* | 7/2017 | Penilla | ................ | G10L 21/0208 |
| 2017/0262889 A1* | 9/2017 | Gurunathan | ....... | G06Q 30/0261 |
| 2019/0073547 A1* | 3/2019 | el Kaliouby | ......... | G06V 10/764 |
| 2020/0057487 A1* | 2/2020 | Sicconi | ................... | G06T 7/254 |
| 2020/0202410 A1* | 6/2020 | Edwards | ............. | G06Q 30/0641 |
| 2020/0410541 A1* | 12/2020 | James | ................ | G06Q 30/0266 |
| 2021/0166103 A1* | 6/2021 | Jackson | ................... | G06N 3/08 |

\* cited by examiner

SYSTEM AND METHOD OF DISPLAYING IN-VEHICLE ADVERTISING CONTENT

BACKGROUND

Field of the Invention

The present invention generally relates to a system and method of displaying in-vehicle advertising content. More specifically, the present invention relates to a system and method of generating customized advertising content and displaying the customized advertising content in a vehicle.

Background Information

In-vehicle infotainment systems (IVI) deliver content, such as entertainment and information. An occupant of a vehicle would benefit from content being deliverable to the vehicle's IVI. The occupant would further benefit from the content being deliverable at a time that does not pose a distraction such that the delivered content is more readily consumed by the occupant.

SUMMARY

One object of the disclosure is to provide a system and method of displaying in-vehicle advertising content through a vehicle's IVI.

The system and method of generates customized advertising content and displays the customized advertising content in a vehicle during a time period when the driver is in a safe driving situation and in a receptive mode for the advertising content. The advertising content is partially derived from vehicle health and trip data transmitted by the vehicle (i.e., connected car). An advertisement is generated based on the driver's transmitted connected car data and one or more databases. The databases include, but are not limited to, aggregated connected car data of drivers of the same or similar model, dealer databases, aftersales databases, and driver's public social media data. Each evaluation period is evaluated based on receptivity of the driver to the advertisement and the safety level of the driving situation. When the evaluation period does not meet the criteria for display, the advertisement is prevented from being displayed and will be stored for display when the criteria are met. When the evaluation period meets the criteria for display, the advertisement is displayed on a display of an in-vehicle infotainment system. The in-vehicle infotainment system is configured to dynamically evaluate the evaluation period to determine whether the advertisement can be displayed or whether the advertisement should continue to be stored for display at a later time.

In view of the state of the known technology, one aspect of the present disclosure is to provide a method of displaying advertising content includes transmitting data associated with a vehicle to a data center. An advertisement is generated based on the transmitted data. The advertisement is transmitted to the vehicle. An evaluation period is determined during which the advertisement is prevented from being displayed. The advertisement is displayed on a display of an in-vehicle infotainment system following the evaluation period.

Another aspect of the present invention is to provide a vehicle advertisement displaying system including a wireless communication system, an electronic controller and an in-vehicle infotainment system. The wireless communication system is disposed on a vehicle and configured to transmit data associated with the vehicle and to receive an advertisement based on the transmitted data. The in-vehicle infotainment system is configured to determine an evaluation period during which the advertisement is prevented from being displayed and to determine when to stop the evaluation period to display the advertisement. The in-vehicle infotainment system includes a display configured to display the advertisement when the evaluation period is stopped.

Also other objects, features, aspects and advantages of the disclosed energy absorbing structure for a vehicle frame will become apparent to those skilled in the art from the following detailed description, which, taken in conjunction with the annexed drawings, discloses exemplary embodiments of the energy absorbing structure for a vehicle frame.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
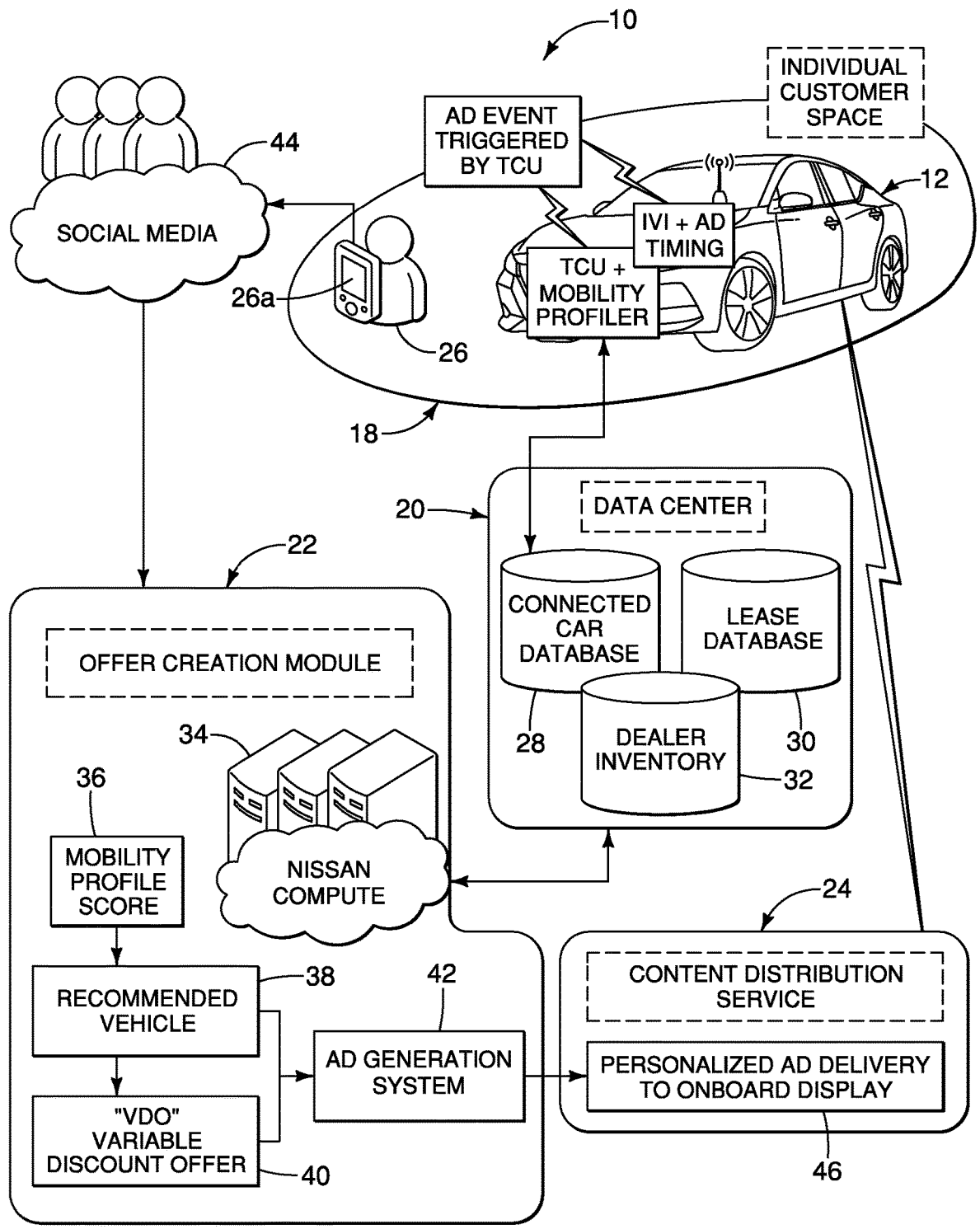
FIG. 1 is a schematic diagram illustrating a system for displaying in-vehicle advertising content.
Figure 6:
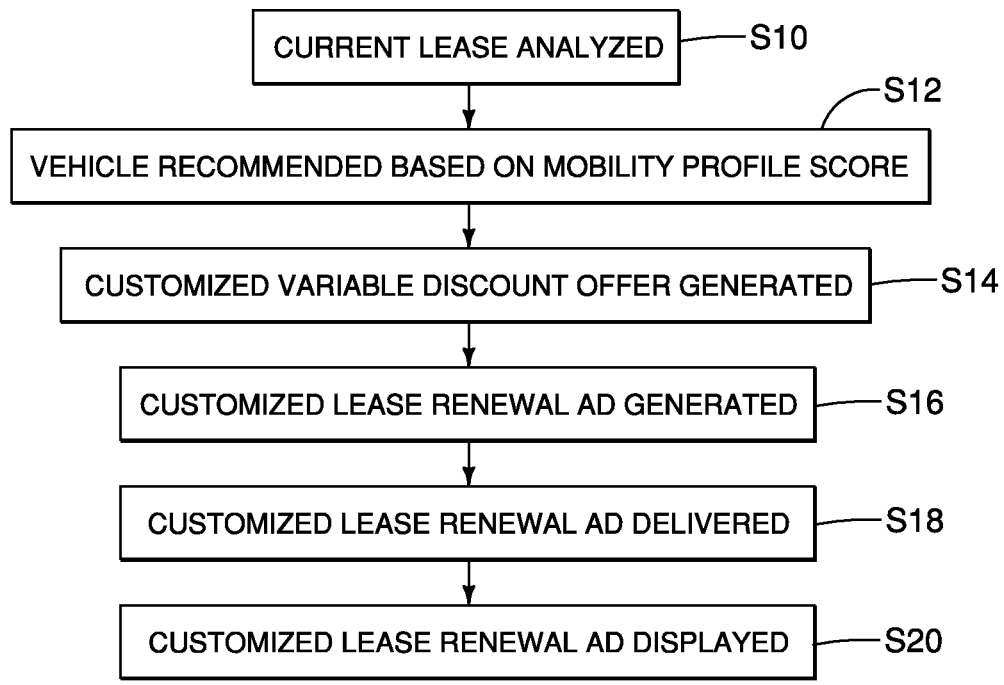
FIG. 6 is a flowchart illustrating generating in-vehicle advertising content.
Figure 7:
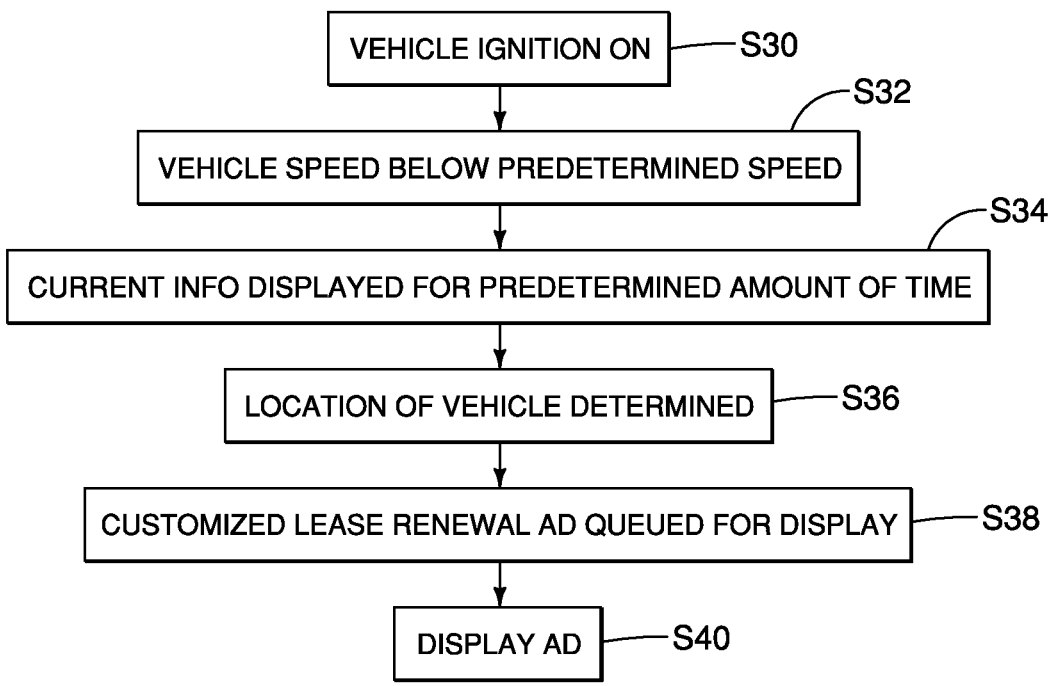
FIG. 7 is a flowchart illustrating displaying the in-vehicle advertising content.
Figure 8:
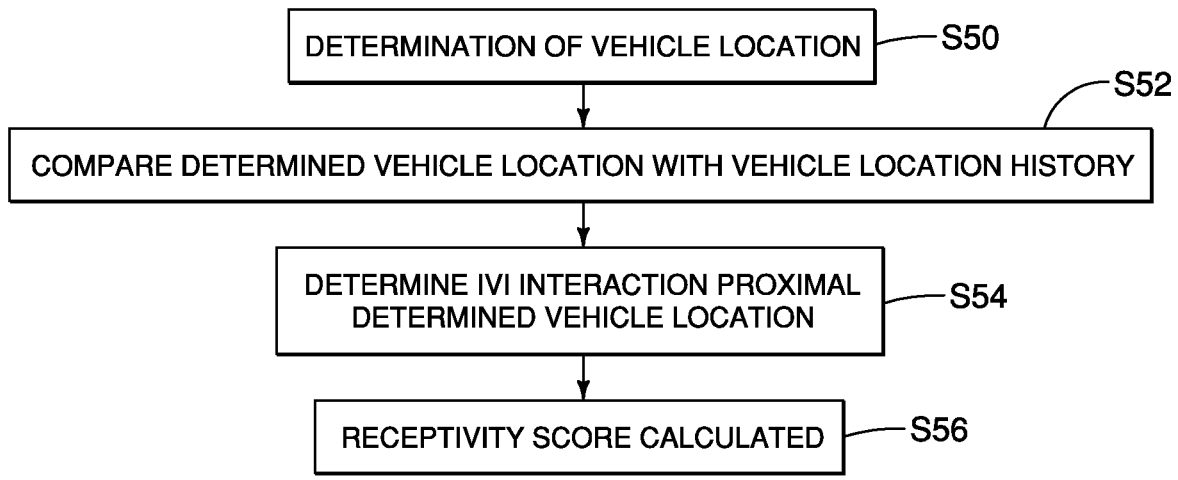
FIG. 8 is a flowchart illustrating determining a receptivity score.
Figure 9:
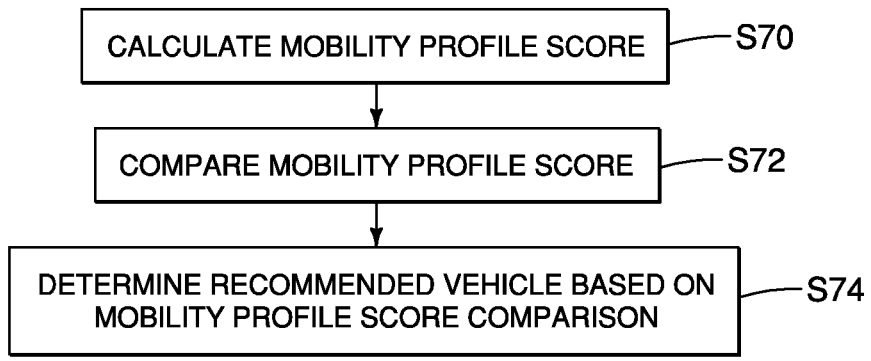
FIG. 9 is a flowchart illustrating creating a customized offer as the in-vehicle advertising content.

Referring initially to FIG. 1, an in-vehicle advertising content display system 10 is illustrated in accordance with an exemplary embodiment of the present invention. The in-vehicle advertising content display system 1 is configured to generate and transmit content displayable by a vehicle 12. The advertising content received by the vehicle 12 is displayable by a display 14 of an in-vehicle infotainment system 16 of the vehicle 12 in accordance with the flowcharts of FIGS. 6-9. FIG. 6 illustrates a method of generating in-vehicle advertising content in accordance with an exemplary embodiment of the present invention. FIG. 7 illustrates a method of displaying the in-vehicle advertising content in accordance with an exemplary embodiment of the present invention. FIG. 8 illustrates determining a receptivity score in accordance with an exemplary embodiment of the present invention. FIG. 9 illustrates creating a customized offer as the in-vehicle advertising content in accordance with an exemplary embodiment of the present invention.

The in-vehicle advertising content display system 10 includes an individual customer space 18 that is in communication with a data center 20, which receives data transmitted by the vehicle 12. The data center 20 is in communication with an offer creation module 22, which receives data transmitted by the data center 20. The offer creation module 22 generates advertising content based on the received data. The offer creation module 22 is in communication with a content distribution service 24, which receives the advertising content created by the offer creation module 22. The content distribution service 24 is in communication with the vehicle 12. The content distribution service 24 transmits the advertising content received from the offer creation module 22 to the vehicle 12.

Figure 2:
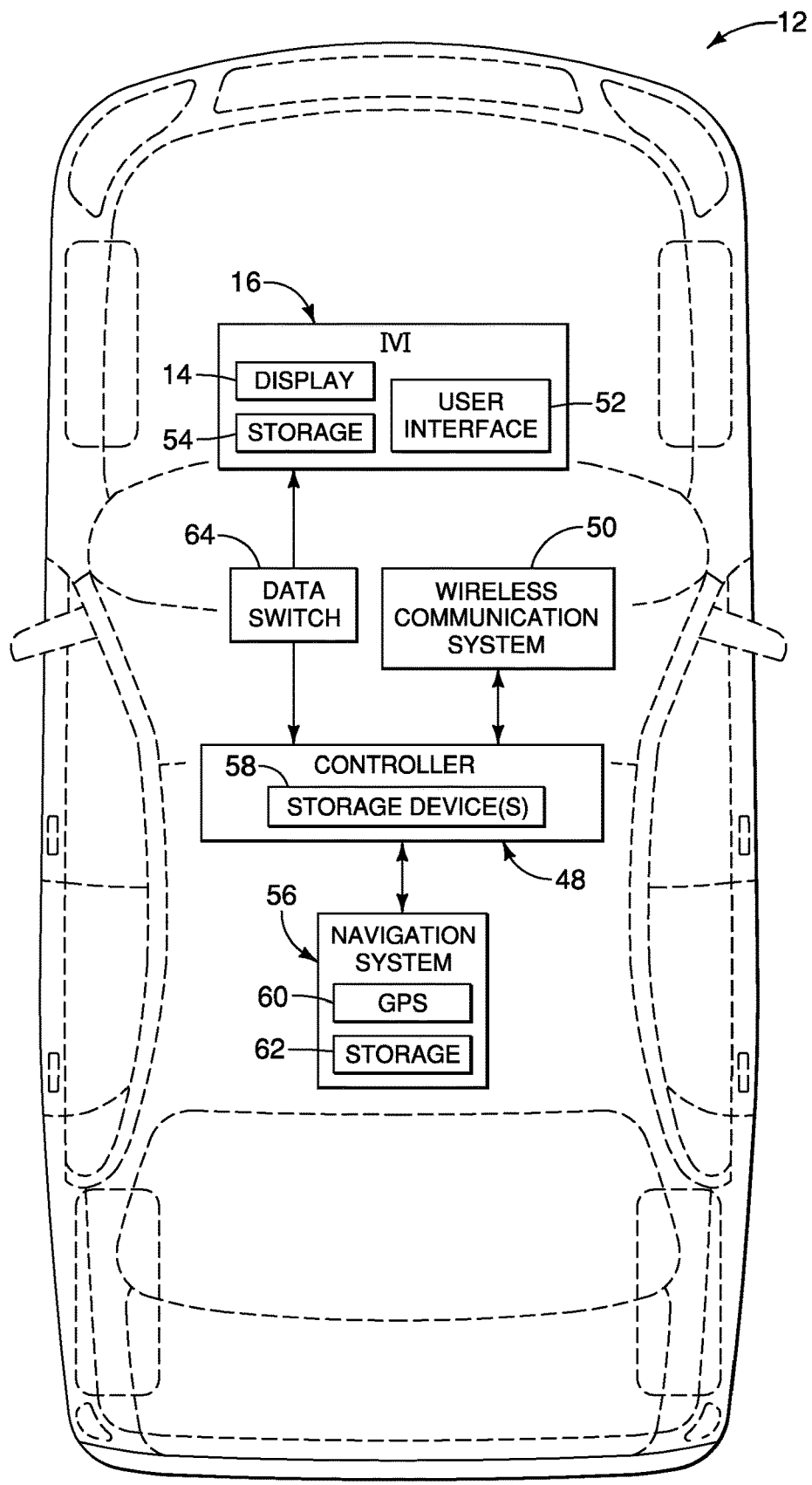
FIG. 2 is a block diagram of a vehicle of FIG. 1 equipped with a system for displaying in-vehicle advertising content.

The individual customer space 18 includes the vehicle 12 and an occupant, or lessee, 26, as shown in FIG. 1. The vehicle 12 includes an in-vehicle infotainment system (IVI) 16, an electronic controller 48, such as a telematics control unit (TCU), and a wireless communication system 50, as shown in FIG. 2. The individual customer space 26 further includes a mobile device 26a of the occupant 26, as shown in FIG. 1. The controller 48 wirelessly communicates vehicle data to the connected car database 28 of the data center 20.

The data center 20 includes a plurality of databases that store data. As shown in FIG. 1, the data center 20 includes a connected car database 28, a lease database 30 and a dealer inventory database 32. The connected car database 28 includes vehicle data regarding all vehicles that are connectable to the data center 20. The lease database 30 includes data regarding leases of the vehicle that are connectable to the data center 20. The dealer inventory database 32 includes data regarding available vehicles at dealerships connectable to the data center 20.

The offer creation module 22 is located in the cloud 34, as shown in FIG. 1. In other words, the offer creation module 22 is stored on databases accessible through the internet. The offer creation module 22 includes a mobility profile module 36, a recommended vehicle module 38, a variable discount offer (VDO) module 40, and an ad generation system 42.

The content distribution service 24 includes a personalized advertising content delivery module 46, as shown in FIG. 1. The content distribution service 24 is a telematics service provider (TSP), such as Sirius XM, that wirelessly communicates with vehicles 12 to transmit, receive and store data.

The vehicle 12 of the in-vehicle advertising content display system 10 is illustrated in accordance with an exemplary embodiment of the present invention, as shown in FIG. 2. The vehicle 12 includes the in-vehicle infotainment system (IVI) 16, the controller 48, and the wireless communication system 50.

Figure 4:
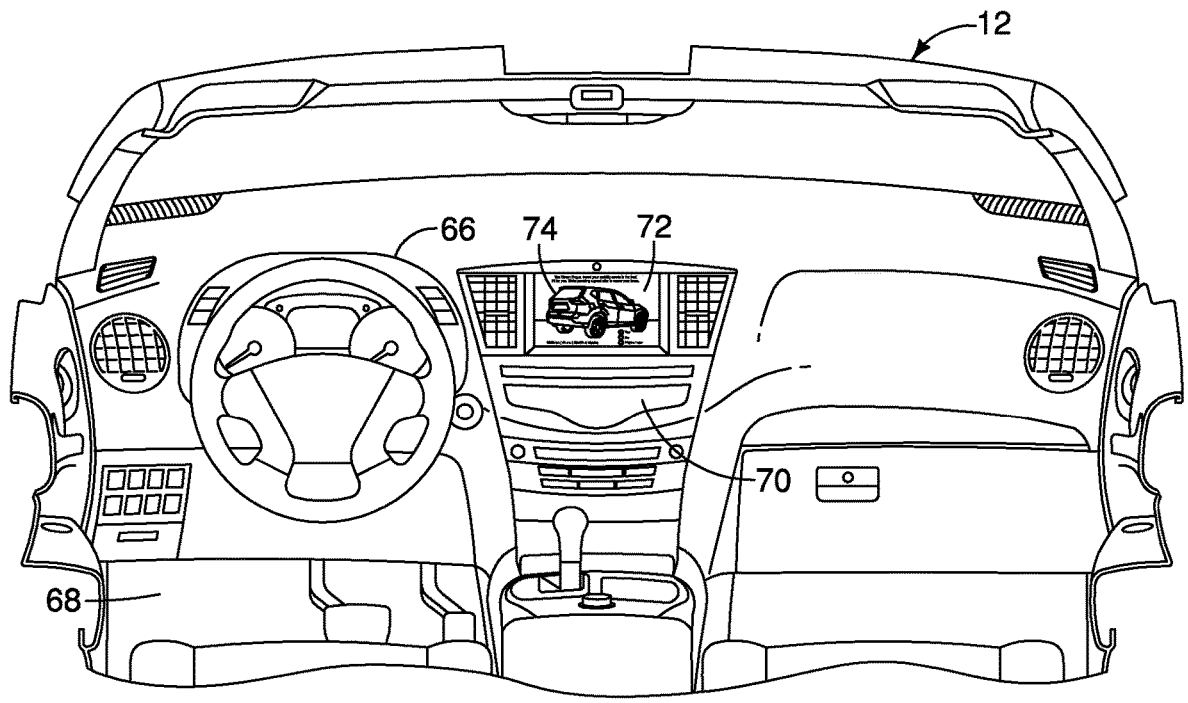
FIG. 4 is an illustration of advertising content displayed on a display of an in-vehicle infotainment system of the vehicle of FIG. 2.
Figure 5:
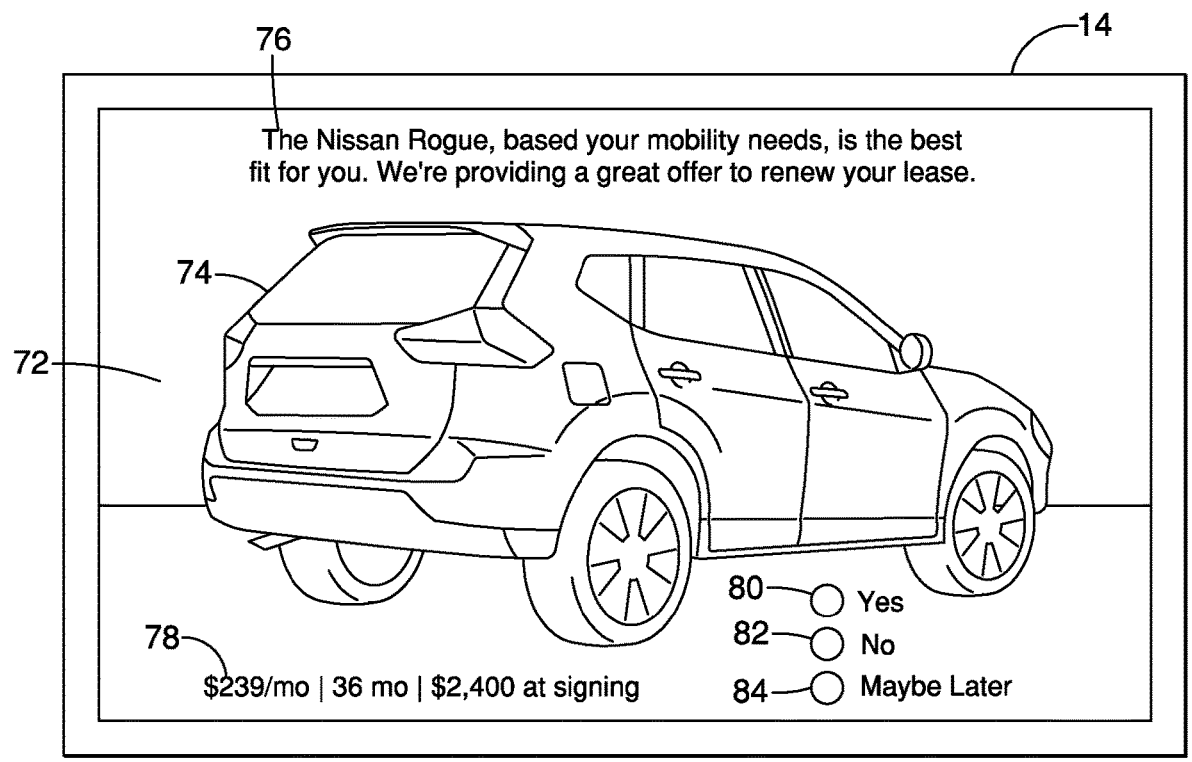
FIG. 5 is an illustration of the advertising content of FIG. 4.

The IVI 16 includes the display 14 and a user interface 52, as shown in FIG. 2. The display 14 includes conventional touch screen controls. The user interface 52 and the display 14 allow the vehicle occupant 26 to interact with the advertising content delivered by the in-vehicle advertising content display system 10. The IVI 16 can further include a storage device 54 to store programs and/or information, such as programs and/or information associated with the generation of the advertising content (FIGS. 4 and 5). The IVI 16 is further configured to display vehicles messages or screen images from the mobile device 26a on the display 14.

The controller 48 preferably includes a microcomputer with a control program that is configured to control the components of the in-vehicle advertising content display system 10 as discussed below. The controller 48 includes other conventional components, such as an input interface circuit, an output interface circuit, and storage device(s), such as a ROM (Read Only Memory) device and a RAM (Random Access Memory) device. The microcomputer of the controller 48 is at least programmed to control the in-vehicle advertising content display system 10 in accordance with the flowcharts of FIGS. 6-9 discussed below. The microcomputer of the controller 48 is programmed to control the IVI 16, a navigation system 56, and the wireless communication system 50, and to make determinations or decisions, as discussed herein. The memory circuit stores processing results and control programs, such as ones for the IVI 16, the navigation system 56, and the wireless communication system 50. The controller 48 is operatively coupled to the IVI 16, the navigation system 56, and the wireless communication system 50 in a conventional manner, as well as other electrical systems in the host vehicle 12, such the turn signals, windshield wipers, lights and any other suitable systems. Such a connection enables the controller 48 to monitor and control any of these systems as desired. The internal RAM of the controller 48 stores statuses of operational flags and various control data. The internal ROM of the controller 48 stores the information for various operations. It will be apparent to those skilled in the art from this disclosure that the precise structure and algorithms for the controller 48 can be any combination of hardware and software that will carry out the functions of the exemplary embodiments of the present invention. Furthermore, the controller 48 can communicate with the other components of the in-vehicle advertising content display system 10 discussed herein via, for example a controller area network (CAN) bus or in any other suitable manner as understood in the art.

The controller 48 can include or be in communication with the user interface 52 of the IVI 16. The user interface 52 can include, for example, a human-machine interface (HMI), such as a control panel or a touchscreen graphical user interface (GUI), which enables the occupant 26 (e.g., the driver and/or passenger) to interact with content delivered by the in-vehicle advertising content display system 10 as understood in the art and discussed herein. The user interface 52 can be incorporated with the display 14 to facilitate interaction by the occupant 26. The controller 48 can further include or be in communication with one or more storage devices 58, such as a vehicle memory, that can store information as described herein.

The vehicle 12 can further include the vehicle navigation system 56, as shown in FIG. 2. The vehicle navigation system 56 includes, for example, a communication device 60, such as a GPS (Global Positioning System) communication device, that communicates with the GPS satellites. The communication device 60 can also communicate with one or more terrestrial units and a base station or external server to obtain location information. Furthermore, the vehicle navigation system 56 can include or is in communication with a storage device 62 that can store vehicle information, such as previous vehicle route information, previous location information, or other vehicle information that the GPS is capable of generating, in addition to map data and other location related data as understood in the art. The vehicle navigation system 56 can receive vehicle data from any suitable source, such as a remote device capable of connecting with the navigation system 56.

The vehicle 12 further includes the wireless communication system 50. The wireless communication system 50 is a communication transceiver for performing a wireless communication with an external wireless communication device, as is understood in the art. The wireless communication system 50 can be configured for short-range wireless communication, such as Bluetooth, and/or for communication over a wireless network.

Figure 3:
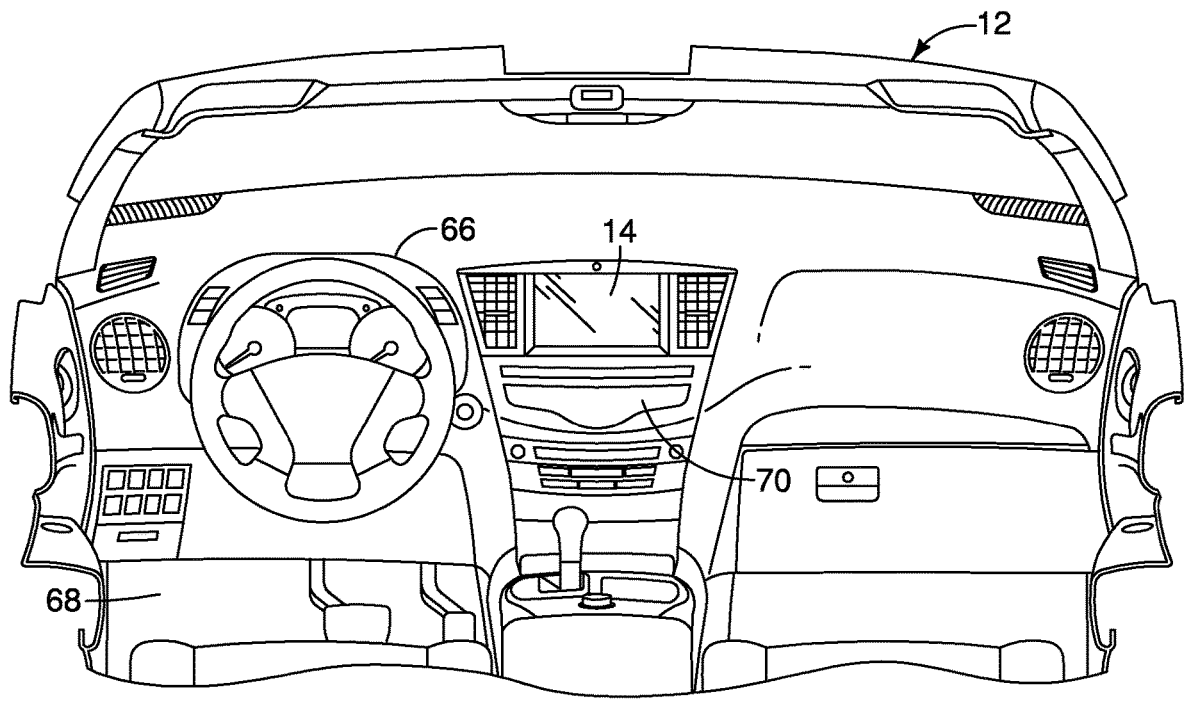
FIG. 3 is a perspective view of an instrument panel in a passenger compartment of the vehicle of FIG. 2.

As shown in FIGS. 3 and 4, an instrument panel 66 is located within a passenger compartment 68 of the vehicle 12. The display 14 and a control panel 70 can both be disposed as part of the instrument panel 66. The control panel 70 can also function as part of the user interface 52 of the IVI 16 for a user to interact with content 72 delivered by the in-vehicle advertising content display system 10.

The in-vehicle advertising content display system 10 generates and delivers content 72 to the IVI 16 of the vehicle 12, as shown in FIGS. 1-9. Deliverable advertising content 72 can include, but is not limited to, customized advertising for a lease renewal, for vehicle maintenance, and vehicle repair. Such advertising content 72 increases lease renewal rates at a dealership, as well as improving customer retention following a transaction at the dealership. The advertising content 72 also facilitates communication between the vehicle owner and the dealership, in addition to providing a reminder to the vehicle owner regarding expiration of a current lease and maintenance and repair work required for the vehicle. Further, the content 72 can include offers, coupons or discounts customized to the vehicle owner. The content 72 can be any customized communication intended for the occupant 26. The IVI 16 controls the display of the delivered content 72 to the vehicle occupant 26.

The method of displaying content 72, such as advertising content, includes transmitting data associated with the vehicle 12 to the data center 20, as shown in FIGS. 1 and 6. The transmitted data can include information regarding the current lease for the vehicle 12. Advertising content, or an advertisement, is generated by the offer creation module 22 based on the transmitted data. The generated advertising content is digitally transmitted to the content distribution service 24. The advertising content is transmitted to the vehicle 12 by the content distribution service 24. The IVI 16 of the vehicle 12 determines an evaluation period during which the advertising content is prevented from being or allowed to be displayed, as shown in FIG. 3. The IVI 16 of the vehicle 12 displays the advertising content following the evaluation period, as shown in FIGS. 4 and 5. The advertising content 72 includes any content deliverable to the vehicle 12 providing offers, discounts, coupons or other promotional materials.

When a lease is determined to be within a predetermined amount of time, such as three months, from the expiration date of a current lease, the advertisement content 72 (FIGS. 4 and 5) is generated and transmitted by the offer creation module 22, as shown in FIG. 1. Information regarding the lease can be stored in the storage device 58 of the controller 48. When the controller 48 determines that the expiration date of the current lease is within the predetermined amount of time, data regarding the vehicle 12, including data regarding the current lease, is transmitted to the data center 20 such that the current lease can be analyzed, as shown in step S10 of FIG. 6.

A lessee mobility profile score for the lessee 26 of the vehicle 12 subject to the current lease is analyzed, as shown in step S70 of FIG. 9, and compared to the mobility profile scores of owners of the identical vehicle, as shown in step S72 of FIG. 9. The mobility profile score for the lessee 26 is determined based on the owner's use of the vehicle 12 and is an analysis of the user's habits. For example, the mobility profile score can be based on vehicle data such as an average trip length or monthly mileage. The trip length data can be analyzed to determine the lessee's usage of the vehicle, such as whether the average trip is short (up to 10 km), medium (between 10 and 20 kilometers, inclusive) or long (over 20 kilometers). When the vehicle 12 is a truck, the mobility profile score can be based on whether the truck is frequently used off road, and/or whether the truck is frequently used for towing. Vehicle data from the connected car database 28 can be transmitted to the vehicle 12 to determine the mobility profile score. The mobility profile score can further be based on social media of the lessee 26 and social media data 44 of the lessee's contacts. The mobility profile score for the lessee can be determined by the vehicle controller 48 and transmitted by the wireless communication system 50 to the connected car database 28 of the data center 20. The data center 20 can then transmit the mobility profile score for the lessee for the vehicle 12 subject to the current lease to the cloud 34 for storage. The mobility profile score is used to determine whether the generated lease advertisement is for a more recent model of the current vehicle, or whether a different model is more suitable for the lessee, as shown in step S74 of FIG. 9. The new vehicle is recommended based on the mobility profile score, as shown in step S12 of FIG. 6.

A data switch 64, as shown in FIG. 2, includes a controller area network interface (CAN bus). The controller 48 processes the mobility profile score for the lessee from the vehicle data from the CAN bus. As shown in FIG. 1, the mobility profile score 36 is transmitted to the offer creation module 22 for use by the recommended vehicle module 38.

As shown in FIG. 1, when the mobility profile score 36 indicates the current lease vehicle 12 is not a suitable fit for the lessee, the recommended vehicle module 38 uses the mobility profile score 36 to determine a more suitable vehicle for the lessee for a new lease. The current lease vehicle 12 is determined to not be suitable when the mobility profile score 36 for the lessee 26 is not comparable to the mobility profile scores of other lessees in similar vehicle models. The mobility profile scores of other lessees can be obtained from the connected car database 28 of the data center 20. The social media data of the lessee 26 can be analyzed to determine a new mobility profile score for the lessee. Social media interests are correlated with metrics, such as monthly miles driven, aggregated, and then scored. Scaling and transformations are applied to the new mobility profile scores to normalize with a database of actual driving. The new mobility profile score is compared to mobility profile scores of lessees of other vehicle models and to scores of an aggregated set of the lessee's social media contacts 44. The best vehicle match is determined based on the new mobility profile score that includes social media data.

When the mobility profile score 36 indicates the current lease vehicle 12 is a suitable vehicle for the lessee, the recommended vehicle module 38 determines a newer model of the current vehicle 12 to be the subject of a new lease offer. The current lease vehicle 12 is determined to be suitable when the mobility profile score 36 for the lessee 26 is comparable to the mobility profile scores of other lessees in similar vehicle models. The mobility profile scores of other lessees can be obtained from the connected car database 28 of the data center 20.

The VDO module 40 receives the recommended vehicle from the recommended vehicle module 38, as shown in FIG. 1, to determine a variable discount offer (VDO). The VDO is calculated using several factors. A mobility intent of the lessee is a factor used to determine the VDO. The mobility intent for the lessee uses the lessee's social media to determine factors affecting usage of the vehicle, such as, but not limited to, where the lessee lives, the lessee's profession, and where the lessee vacations. The information from the lessee's social media can be transmitted from the lessee's mobile device 26*a* to the vehicle controller 48 through the wireless communication system 50, which can then be transmitted to the connected car database 28 of the data center 20. Another factor considered for the VDO is the lessee's social media community's mobility habits. This is a similar analysis as the mobility profile score for the lessee, but for contacts of the lessee. Contacts can be determined through any social media account. The habits of the lessee's social media contacts 44 are transmitted to the offer creation module 22. Still another factor that can be considered for the VDO is the history of other discount offers to the lessee, which is a variable marketing expense (VME). In other words, previous offers transmitted to the lessee are analyzed in determining the current VDO. The customized VDO is generated, as shown in step S14 of FIG. 6.

The VDO is transmitted to the ad generation system 42 to generate a customized advertisement 72 directed to a new lease offer, as shown in FIG. 1. The ad generation system 42 can include data from a lease database 30 and a dealer inventory database 32 to generate the customized advertisement 72.

An exemplary advertisement 72 is shown in FIGS. 4 and 5. The advertisement 72 includes a background 76, the customized VDO 78 and an image 74 of the recommended vehicle determined by the recommended vehicle module 38. The background 76 is determined based on the lessee's social media feed. The background 76 can include a scene, such as a forest or a beach, that is determined to be a preferred location based on the lessee's social media feed. The background 76 can include text including information about the vehicle 74 determined to be the best fit for the lessee. The customized VDO 78 includes information regarding the monthly lease payment, the term of the lease, and the amount due at signing of the new lease. The customized advertisement 72, such as a lease renewal, is generated, as shown in step S16 of FIG. 6.

The customized advertisement 72 is digitally transmitted from the offer creation module 22 to the content distribution service 24, as shown in FIG. 1. The customized advertisement 72 includes a target vehicle identification number (VIN) associated with the vehicle 12. The content distribution service 24 identifies an IP address associated with the vehicle 12. The content distribution service 24 identifies a time period having a low transmit activity and a low receive activity for the identified vehicle 12 to facilitate the customized advertisement 72 being received by the vehicle 12. The personalized ad delivery module 46 delivers the customized advertisement 72 to the vehicle 12 associated with the advertisement 72 through the wireless communication system 50 of the vehicle 12. The customized advertisement 72 includes instructions, such as code, for the vehicle 12 to store the received customized advertisement 72. The customized advertisement 72, such as a lease renewal, is delivered, as shown in step S18 of FIG. 6.

The transmitted advertisement 72 is received by the wireless communication system 50 and transmitted to the controller 48. The advertisement 72 can be stored in the storage device 58 of the controller 48 or transmitted to the storage device 54 of the IVI 16. Preferably, the advertisement 72 is stored in the storage device 54 of the IVI 16.

When the transmitted advertisement 72 is received by the vehicle 12, an evaluation period is determined by the IVI during which the advertisement 72 is prevented from being or allowed to be displayed by the display 14 of the IVI 16, as shown in FIG. 3. A processor in the IVI executes the instructions included with the customized advertisement 72 to store or display the received customized advertisement 72. The advertisement 72 is displayed by the display 14 of the IVI 16 following the evaluation period. In other words, the IVI 16 dynamically determines the evaluation period, and when the criteria are met the advertisement 72 is displayed, and when the criteria are not met the advertisement 72 is stored for display at a later time when the criteria are met. The IVI 16 determines an optimal time for displaying the advertisement 72 on the display 14 of the IVI 16. The customized advertisement 72, such as a lease renewal, is displayed, as shown in step S20 of FIG. 6.

A flowchart illustrating the determination of the evaluation period is shown in FIG. 7. The evaluation period determination is based on vehicle data from the CAN bus interface of the data switch 64. As shown in step S30 of FIG. 7, the IVI 16 determines whether the vehicle ignition is on. When the vehicle ignition is determined to be on, the process moves to step S32 to determine whether the vehicle 12 is moving less than a predetermined speed, such as five miles per hour, or whether the vehicle 12 is stopped. When the vehicle 12 is moving less than the predetermined speed or is stopped, the process moves to step S34. When the conditions of either step S30 or step S32 are not met, the process is ended and the content 72 remains stored in the storage device 54 of the IVI 16.

In step S34 of FIG. 7, the IVI 16 determines whether the current information displayed on the display 14 of the IVI has been displayed for a predetermined amount of time. When the current information has been displayed for a predetermined amount of time, the process moves to step S36. When the current information has not been displayed for a predetermined amount of time, the process ends and the delivered content 72 remains stored in the storage device 54 of the IVI 16.

In step S36 of FIG. 7, the IVI 16 checks the location of the vehicle 12. The IVI 16 receives the vehicle location data from the navigation system 56. The vehicle location data is used to determine a receptivity score, which determines when to end the evaluation period and to display the delivered content 72.

FIG. 8 illustrates a method of calculating the receptivity score, although the receptivity score can be calculated in any suitable manner. In step S50, the vehicle location data is determined, which corresponds to step S36 of FIG. 7. The process moves to step S52 in which the current location of the vehicle 12 is compared with a history of locations of the vehicle 12 stored in the IVI storage device 54.

The process then moves to Step S54 to determine the number of interactions, such as through the user interface 52, with the IVI within a predetermined distance of the current location. This indicates the likelihood of the lessee 26 interfacing with the IVI 16 at the current location. The greater the number of interactions with the IVI 16 within a predetermined distance from the current vehicle location in the location history, the higher the receptivity score. The receptivity score is calculated in step S56.

In step S38 of FIG. 7, when the receptivity score is high, or above a predetermined value, the IVI 16 ends the evaluation period and queues the delivered content 72 for display by the IVI. The IVI 16 displays the delivered content 72 on the display 14 at a safe time determined by the IVI. A safe time is the first time after queuing the delivered content 72 that the vehicle 12 is at a stop (i.e., not moving) and no other important messages are being displayed on the display 14 of the IVI 16. The IVI 16 displays the delivered content 72 on the display 14 of the IVI, as shown in step S40 of FIG. 7.

An example of a customized advertisement 72, such as a lease renewal advertisement, is shown in FIG. 5. The customized advertisement 72 is displayed on the display 14 of the IVI 16. The background 76 of the customized advertisement 72 is representative of the lessee's interests as indicated by the lessee's social media. The picture of the new vehicle 74 is based on the recommended vehicle determined by the recommended vehicle module 38. The color of the new vehicle 74 can be based on social media posts by the lessee 26. The customized VDO 78 includes information regarding the monthly lease payment, the term of the lease, and the amount due at signing of the new lease.

The customized advertisement 72 can further include a plurality of soft keys, or buttons, 80, 82 and 84 selectable by the lessee 26. As shown in FIG. 5, the soft keys can include a yes button 80, a no button 82 and a maybe later button 84. The soft keys 80, 82 and 84 can be selected by the lessee 26 based on the lessee's response to the customized advertisement 72. When the yes button 80 is selected, the acknowledgement is sent to the vehicle manufacturer and a new lease is sent to the lessee. When the no button 82 or the maybe later button 84 is selected, the process is repeated and a follow-up offer is generated and delivered at a later time. The soft keys 80, 82 and 84 can be selected through the touch-screen of the display 14 or through the instrument panels 66 and 70.

The customized advertisement 72 is any content deliverable to the vehicle 12 providing offers, discounts, coupons or other promotional materials, such as the lease renewal shown in FIG. 5. The customized advertisement 72 delivered to the vehicle 12 can be used for maintenance and repair work at a dealership. A stored diagnostic trouble code (DTC) and/or data from the engine/electronic control unit (ECU) can be used to determine the need for maintenance and/or repair work for the vehicle 12. The generation of a customized advertisement 72 is triggered based on the DTC and/or ECU data.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the in-vehicle advertising content display system. Accordingly, these terms, as utilized to describe the present invention should be interpreted relative to a vehicle equipped with the in-vehicle advertising content display system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. A method of displaying advertising content, comprising:
    transmitting data associated with a vehicle to a data center, the data including at least information regarding a current lease for the vehicle;
    determining a mobility profile score for a lessee of the vehicle, the mobility profile score being indicative of usage of the vehicle by the lessee;
    comparing the determined mobility profile score for the lessee to mobility profile scores of other lessees in similar vehicles;
    determining a recommended new vehicle for a new lease for the lessee based on the comparison of the mobility profile score for the lessee with the mobility profile scores of other lessees in similar vehicles, recommending the same vehicle model as the new vehicle when the mobility profile score for the lessee is comparable to the mobility profile scores of the other lessees in similar vehicles and recommending a different vehicle model as the new vehicle when the mobility profile score for the lessee is not comparable to the mobility profile scores of the other lessees in similar vehicles;
    generating an advertisement based on the transmitted data and based on the determined recommended new vehicle;
    transmitting the advertisement to the vehicle;
    determining an evaluation period during which the advertisement is prevented from being displayed;
    determining a speed of the vehicle;
    ending the evaluation period when the vehicle speed is determined to be less than a predetermined speed; and displaying the advertisement on a display of an in-vehicle infotainment system following the evaluation period, the display being disposed in an interior of the vehicle.

2. The method according to claim 1, wherein the displayed advertisement includes an offer for a new lease for the recommended new vehicle.

3. The method according to claim 2, further comprising transmitting the new lease to the lessee responsive to the lessee pressing an acceptance button displayed in the displayed advertisement on the display of the in-vehicle infotainment system.

4. The method according to claim 2, wherein the displayed advertisement includes an image of the new vehicle.

5. The method according to claim 2, further comprising transmitting a new advertisement to the vehicle associated with the current lease responsive to the lessee pressing a button other than an acceptance button displayed in the displayed advertisement on the display of the in-vehicle infotainment system.

6. The method according to claim 1, wherein ending the evaluation period further comprises determining when a receptivity score is above a predetermined value.

7. The method according to claim 6, wherein determining the receptivity score includes comparing a current location of the vehicle with a history of interactions with the in-vehicle infotainment system proximal to the current location.

8. The method according to claim 1, wherein determining the mobility profile score includes determining an average trip length for the current vehicle.

9. The method according to claim 1, wherein determining the mobility profile score includes determining an average type of usage of the current vehicle.

10. The method according to claim 1, further comprising recommending a newer version of the current vehicle as the new vehicle when the mobility profile score for the lessee is comparable to the mobility profile scores of the other lessees in similar vehicles.

11. The method according to claim 1, wherein transmitting data further includes transmitting a diagnostic code from an engine control unit.

12. The method according to claim 1, further comprising determining recommended maintenance for the vehicle based on the transmitted data; and
the displayed advertisement includes a discount coupon for the recommended maintenance.

13. A vehicle advertisement displaying system, comprising:
a storage device including a memory disposed in a vehicle, the storage device being configured to store information regarding a current lease for the vehicle;
a wireless communication system disposed on a vehicle and configured to transmit data associated with the vehicle and receive an advertisement, the transmitted data including the information regarding a current lease for the vehicle and a mobility profile score of the lessee of the vehicle;
an in-vehicle infotainment system configured to determine an evaluation period during which the advertisement is prevented from being displayed and to determine when to stop the evaluation period to display the advertisement, the in-vehicle infotainment system including a display configured to display the advertisement when the evaluation period is stopped, the display being disposed in an interior of the vehicle;
a controller disposed on the vehicle and configured to
determine the mobility profile score for the lessee of the vehicle, the mobility profile score being based on information indicative of usage of the vehicle by the lessee; and
determine a speed of the vehicle and to stop the evaluation period when the vehicle speed is determined to be less than a predetermined speed, and
display the advertisement on the display of the in-vehicle infotainment system following the evaluation period; and
a data center configured to
compare the determined mobility profile score for the lessee to mobility profile scores of other lessees in similar vehicles,
determine a recommended new vehicle for a new lease for the lessee based on the comparison of the mobility profile score for the lessee with the mobility profile scores of other lessees in similar vehicles,
recommend the same vehicle model as the new vehicle when the mobility profile score for the lessee is comparable to the mobility profile scores of the other lessees in similar vehicles,
recommend a different vehicle model as the new vehicle when the mobility profile score for the lessee is not comparable to the mobility profile scores of the other lessees in similar vehicles,
generate the advertisement based on the transmitted data and based on the determined recommended new vehicle, and
transmit the advertisement to the vehicle.

14. The vehicle advertisement displaying system according to claim 13, wherein
the displayed advertisement includes an offer for a new lease for a new vehicle based on the transmitted data.

15. The method according to claim 1, further comprising preventing any transmitted advertisement from being displayed during the evaluation period.

* * * * *